(12) United States Patent
Jaswa et al.

(10) Patent No.: US 7,574,589 B1
(45) Date of Patent: Aug. 11, 2009

(54) BOOTING INTELLIGENT COMPONENTS FROM A SHARED RESOURCE

(75) Inventors: Vijay Jaswa, Saratoga, CA (US); Jeffrey Kidd, Los Altos, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 726 days.

(21) Appl. No.: 11/123,864

(22) Filed: May 5, 2005

(51) Int. Cl.
G06F 9/24 (2006.01)
G06F 15/177 (2006.01)
G06F 1/24 (2006.01)

(52) U.S. Cl. .............................. 713/1; 713/2; 713/100
(58) Field of Classification Search .................... 713/1, 713/2, 100
See application file for complete search history.

(56) References Cited

U.S. PATENT DOCUMENTS

| | | | |
|---|---|---|---|
| 5,479,395 A * | 12/1995 | Goodman et al. .......... 370/438 |
| 5,796,964 A * | 8/1998 | Bass et al. ................... 710/305 |
| 6,442,758 B1 * | 8/2002 | Jang et al. ................... 725/119 |
| 6,785,843 B1 * | 8/2004 | McRae et al. ................. 714/23 |
| 6,876,652 B1 * | 4/2005 | Bell et al. .................... 370/386 |
| 6,886,107 B2 * | 4/2005 | Walsh et al. ..................... 714/4 |
| 7,146,436 B1 * | 12/2006 | Manchester .................. 710/10 |
| 7,233,568 B2 * | 6/2007 | Goodman et al. ........... 370/218 |
| 7,370,224 B1 * | 5/2008 | Jaswa et al. ..................... 714/4 |
| 2003/0235168 A1 * | 12/2003 | Sharma et al. .............. 370/338 |

OTHER PUBLICATIONS

U.S. Appl. No. 10/950,253, filed Sep. 27, 2004, Banada et al.
U.S. Appl. No. 11/060,199, filed Feb. 17, 2005, Jaswa et al.

* cited by examiner

Primary Examiner—Thomas Lee
Assistant Examiner—Ji H Bae

(57) ABSTRACT

Booting intelligent components from a shared resource is disclosed. In various embodiments, booting a line card from a system storage device includes obtaining access to the system storage device, downloading operational code from the system storage device, and releasing access of the system storage device. The downloaded operational code is used by the line card to boot.

21 Claims, 6 Drawing Sheets

BOOTING INTELLIGENT COMPONENTS FROM A SHARED RESOURCE

BACKGROUND OF THE INVENTION

Conventional telecommunications chassis and systems associated with gateway devices typically include a host controller and multiple line cards. Highly available systems additionally include a redundant host controller. In such systems, either the primary or the redundant host controller has access to a central storage repository that stores operational code that processors in the system need for booting. After the active shelf controller boots from the central storage repository, it reads the operational code for each line card in the system and uses a communications link to download the appropriate operational code into each line card. Since the active shelf controller must read the operational code for each line card from the central repository and sequentially download this code over a serial communications link into each line card, such a process for booting processors in a system is slow. In addition, system redundancy may be compromised by using a shelf controller to mediate communication between the line cards and other shared system resources rather than allowing the line cards to directly access such resources.

In order to achieve faster boot times and increased redundancy and system availability for a multi-processor system, it would be useful if each line card in the system could independently access the central storage repository to retrieve its operational code. In addition, it would be useful if the line cards could independently access other shared system resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Booting intelligent components from a shared resource is disclosed. In various embodiments, booting a line card from a system storage device includes obtaining access to the system storage device, downloading operational code from the system storage device, and releasing access of the system storage device. The downloaded operational code is used by the line card to boot. The line card may be a component of a system associated with a gateway device, such as a router, switch, firewall, etc.

Figure 1:
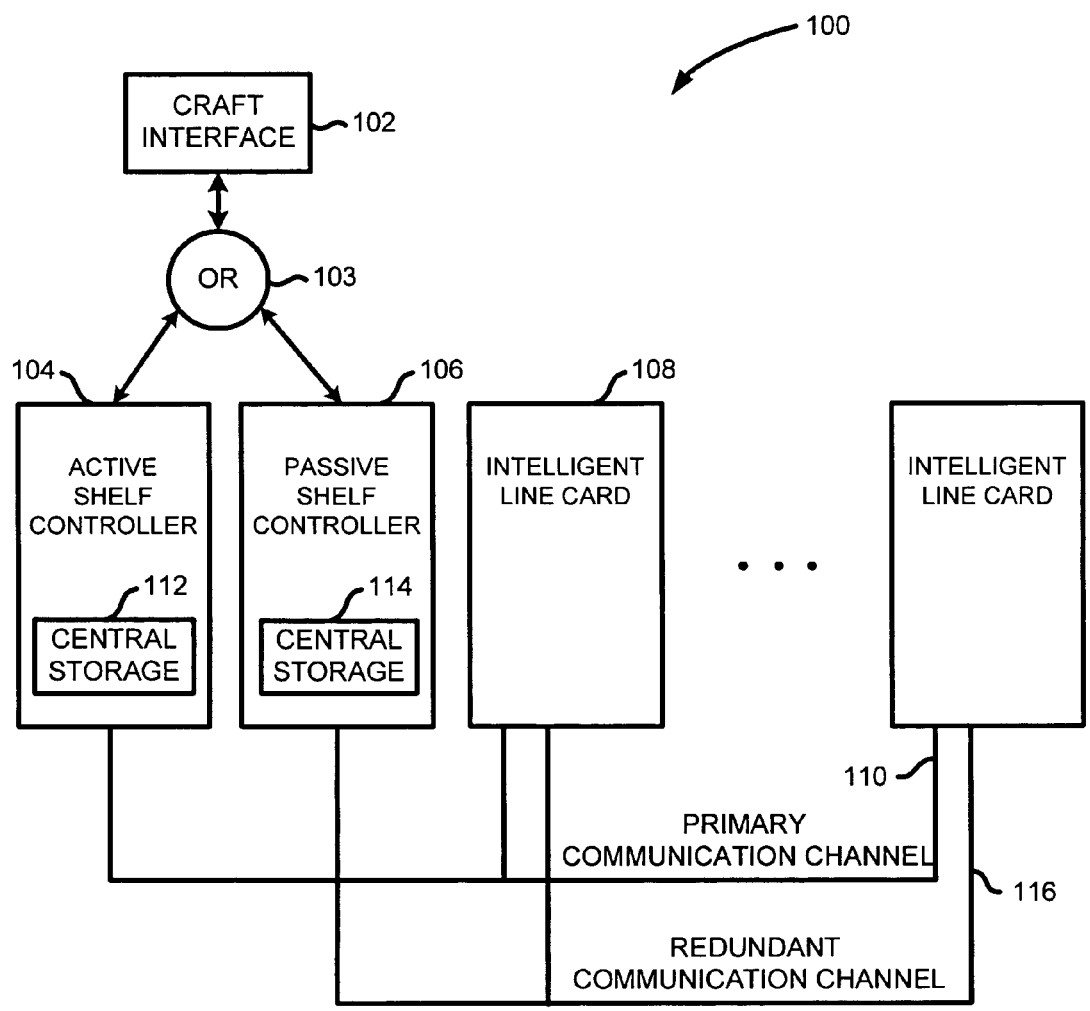
FIG. 1 illustrates a typical telecommunications chassis or system associated with a gateway device that includes both active and passive host controllers.

FIG. 1 illustrates a typical telecommunications chassis or system associated with a gateway device that includes both active (primary) and passive (redundant) host controllers. A host controller may be referred to as a shelf controller since it monitors the health of the chassis and communicates with the external world on behalf of all of the other processors in the system via an external interface. System 100 includes a craft interface 102. Console and modem ports may be accessed via the craft interface. As depicted in FIG. 1, craft interface 102 is accessed by a single host controller, either active shelf controller 104 or passive shelf controller 106 through a switch 103.

In the given example, when active shelf controller 104 is operational, it exclusively maintains direct access to craft interface 102. Active shelf controller 104 mediates communication between craft functions (for example, communication with the console port and/or modem port) and other processor based components of system 100, such as intelligent line card 108. System 100 may include a plurality of intelligent line cards. Active shelf controller 104 and the intelligent line cards, such as intelligent line card 108, communicate via primary communication channel 110. A system storage device, i.e. central storage 112, stores operational code that all processors in the system need to boot. Central storage 112 is directly accessible only by the active shelf controller. The intelligent line cards of system 100, such as intelligent line card 108, serially communicate with the active shelf controller to retrieve their operational code.

Highly available systems such as system 100 of FIG. 1 include a normally passive, redundant shelf controller 106 with a backup copy of central storage, i.e. central storage 114. Passive shelf controller 106 provides redundancy and fault protection by taking over the functionality of active shelf controller 104 in the event that active shelf controller 104 experiences partial or complete failure which may occur, for example, if it becomes misconfigured and/or its operating system crashes. Passive shelf controller 106 communicates with the intelligent line cards via redundant communication channel 116. If active shelf controller 104 is compromised, passive shelf controller 106 may become active and provide operational code to the line cards via central storage 114 and mediate communication between the line cards and the craft functions that are accessible via craft interface 102.

Without direct access to shared system resources from processors associated with other intelligent system components such as the line cards, the amount of redundancy in a system, such as system 100 of FIG. 1, is limited to the number of shelf controllers (typically only 1 or 2). The availability of a system can be improved if each intelligent system component is enabled to independently access shared system resources. The unavailability and/or failure of shelf controller(s) and/or other intelligent system components need not affect the functionality of operating intelligent system components if each such component is able to independently access shared system resources. The multi-processor, multi-master system in which each processor in the system is allowed direct access to one or more shared system resources disclosed herein therefore can achieve higher availability.

In some embodiments, the implementation of a multi-master system in which each intelligent system component (e.g., shelf controller, line card, etc.) may host a shared system resource includes the employment of an independent management plane. The independent management plane is implemented by associating a management plane node that includes an independent management processor with each intelligent system component. The association of such a management plane node with each intelligent system component allows each such component to be independent from whether other intelligent system components are operational. Additionally, management plane nodes associated with operational components may facilitate the reconfiguration and/or restoration of a compromised component to a healthy state. An example of the manner in which management plane nodes are associated with intelligent system components to form an independent management plane is described in U.S. patent application Ser. No. 10/950,253 entitled "System and Method for Enabling Management Functions in a Network," filed Sep. 27, 2004 which is herein incorporated by reference.

Figure 2:
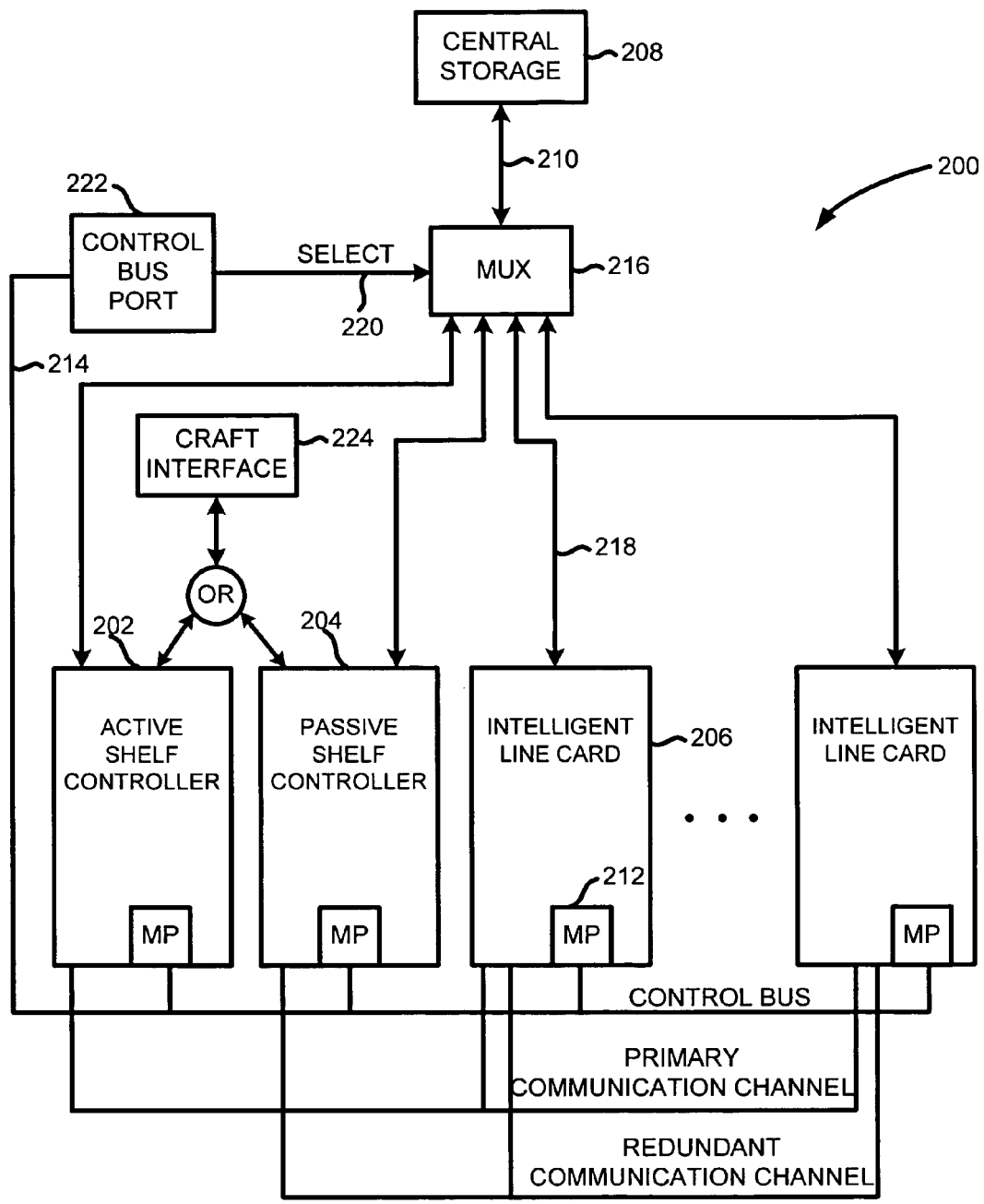
FIG. 2 illustrates an embodiment of a multi-processor, multi-master communications system associated with a gateway device in which each intelligent system component may directly access a system storage device via a single host bus.

FIG. 2 illustrates an embodiment of a multi-processor, multi-master communications system associated with a gateway device in which each intelligent system component may directly access a system storage device via a single host bus. In some embodiments, each intelligent system component may directly access a shared system resource other than or in addition to a system storage device. As depicted in FIG. 2, system 200 includes multiple intelligent system components: active shelf controller 202, passive shelf controller 204, and a plurality of intelligent line cards, such as intelligent line card 206. System 200 of FIG. 2 is similar to system 100 of FIG. 1 with the exception that direct access to central storage (or a backup copy thereof) is not limited to active shelf controller 202 and passive shelf controller 204. In system 200, central storage 208 is a globally shared resource that is also independently accessible by the intelligent line cards, such as intelligent line card 206. Intelligent system components access central storage 208 via bus 210, which may be any single host bus. In some embodiments, bus 210 is a Universal Serial Bus (USB).

Each intelligent system component includes a management processor (MP) that is a part of a management plane node associated with the intelligent system component. For example, MP 212 is associated with intelligent line card 206. The management processors associated with a system, such as system 200, may communicate with one another via an Ethernet management plane or via a global control bus, such as an Inter-Integrated Circuit ($I^2C$™ is a trademark of Philips Semiconductors Corporation) bus, a System Management bus (SMBus™ is a trademark of Intel Corporation), or other appropriate medium. In the example shown, the management processors associated with active shelf controller 202, passive shelf controller 204, and the plurality of intelligent line cards, such as intelligent line card 206, communicate with one another via control bus 214.

Management software running on the management processors determines which intelligent system component has exclusive access to a shared system resource. In the case where redundancy is provided for control of a system resource, management processors on each intelligent system component initially contend to determine which management processor is to be the active host. The nonselected management processors monitor the host and then contend again upon failure of the host to determine which management processor will become the new host. In various embodiments, any appropriate contention scheme may be implemented.

In the case where management processors are time sharing a shared resource such as a shared memory, any appropriate sharing scheme may be implemented. For example, when a particular host needs access to a shared system resource, it can request exclusive access from the current host of the shared resource. When a current host is finished using a shared system resource, it can release access to the shared resource to another host. An example of the manner in which multiple management processors arbitrate among themselves to determine which host has access to a shared resource is described in U.S. patent application Ser. No. 11/060,199 entitled "System and Method for Enabling Redundancy in PCI-Express Architecture," filed Feb. 17, 2005 which is herein incorporated by reference and in "System and Method for Enabling Management Functions in a Network" which was previously incorporated by reference above.

In some embodiments, once the management processor of a host obtains the right to exclusively access a shared system resource, it issues a signal or command on its associated control bus. The signal or command issued by the management processor is converted into a selection control signal suitable for a host selection device of the bus associated with the shared system resource. In some embodiments, the host selection device is a multiplexer (mux).

As depicted in FIG. 2, each potential host of bus 210 is physically connected to a host selection device, i.e. mux 216, associated with bus 210. For example, intelligent line card 206 is connected to mux 216 via connection 218. In some embodiments, bus 210 is a USB bus, mux 216 is a USB mux, and connection 218 is a USB connection. The management processors of the potential hosts of bus 210 determine which host wins access, and the winning host's management processor issues a signal or command on control bus 214 that is converted into selection control signal 220 for mux 216 by control bus port 222. In some embodiments, control bus 214 is an $I^2C$ bus and control bus port 222 is an $I^2C$ port which may be implemented with an $I^2C$ IO Expander. Selection control signal 220 of mux 216 determines which intelligent system component hosts bus 210. That is, selection control signal 220 determines which intelligent system component is logically connected by mux 216 as the host of bus 210. The host of bus 210 exclusively accesses central storage 208.

When booting, the intelligent line cards may independently retrieve their operational code from central storage 208 by serially hosting bus 210. The intelligent line cards of system 200 do not require mediation from either active shelf controller 202 or passive shelf controller 204 to access their associated operational code. However, in system 200, active shelf controller 202 or passive shelf controller 204 mediates communication between the intelligent line cards and craft interface 224 as in system 100 of FIG. 1.

Figure 3:
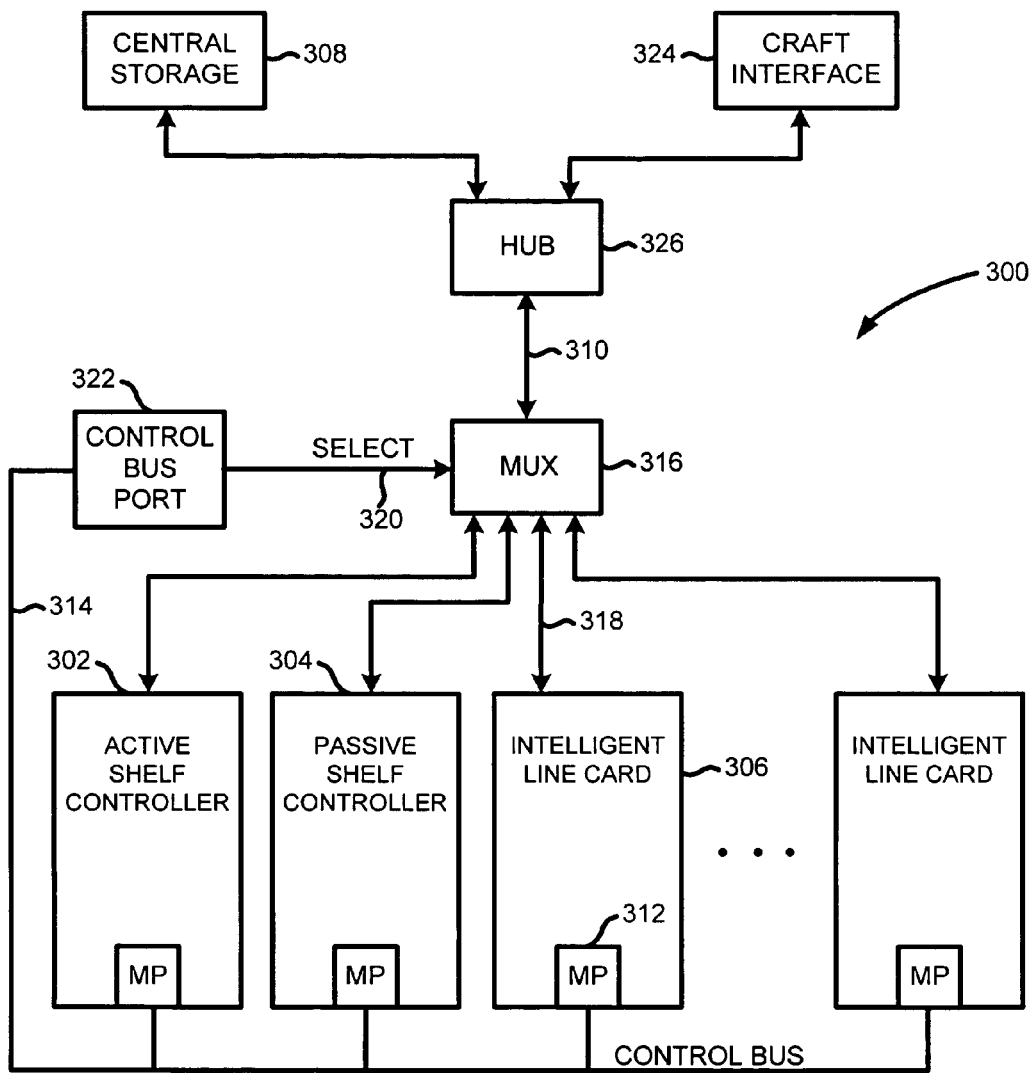
FIG. 3 illustrates an embodiment of a multi-processor, multi-master system associated with a gateway device in which an intelligent system component selected as the master may access central storage as well as the craft interface via a single host bus.

FIG. 3 illustrates an embodiment of a multi-processor, multi-master system associated with a gateway device in which an intelligent system component selected as the master may access central storage as well as the craft interface via a single host bus. Parts 302, 304, 306, 308, 310, 312, 314, 316, 318, 320, 322, and 324 of system 300 of FIG. 3 are similar to corresponding parts shown for system 200 of FIG. 2. Compared to system 200, in system 300 direct access to the craft interface is not limited to active shelf controller 302 and passive shelf controller 304. In system 300, craft interface 324 is a shared resource that is also independently accessible by the intelligent line cards, such as intelligent line card 306. By placing both shared system resources behind hub 326, access to both central storage 308 and craft interface 324 is given to the host that is selected to host bus 310. In some embodiments, hub 326 is a USB hub. In some embodiments, craft interface 324 is accessible via its USB front panel port. In some embodiments, central storage 308 is implemented by a USB flash disk. In some embodiments, exclusive direct access to multiple shared resources other than or in addition to central storage 308 and/or craft interface 324 is given to the master by placing all such resources behind a hub such as hub 326.

Figure 4:
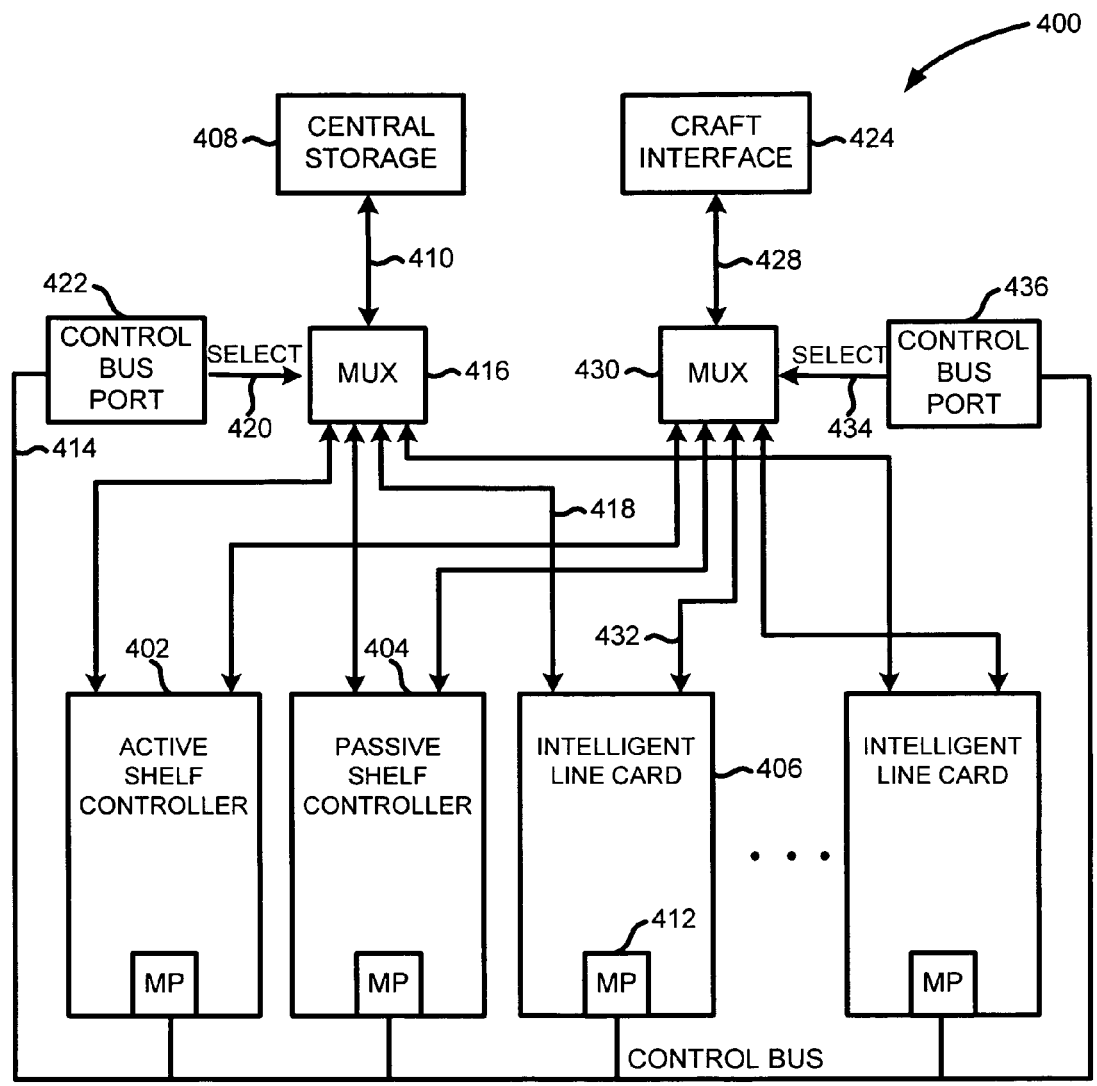
FIG. 4 illustrates an embodiment of a multi-processor, multi-master communications system associated with a gateway device in which each intelligent system component may directly access central storage via one single host bus and the craft interface via another single host bus.

FIG. 4 illustrates an embodiment of a multi-processor, multi-master communications system associated with a gateway device in which each intelligent system component may directly access central storage via one single host bus and the craft interface via another single host bus. Parts 402, 404, 406, 408, 410, 412, 414, 416, 418, 420, 422, and 424 of system 400 of FIG. 4 are similar to corresponding parts shown in system 200 of FIG. 2 and system 300 of FIG. 3. By using separate buses and associated host selection devices, it is possible for one intelligent system component to independently access one system resource while another intelligent system component independently accesses another system resource. Compared to system 300 of FIG. 3 in which exclusive access to multiple system resources is simultaneously given to a single intelligent system component, in system 400 of FIG. 4, simultaneous access to multiple system resources is given to multiple intelligent system components. With the dual bus configuration illustrated in FIG. 4, it is possible for one intelligent system component to access central storage 408 while another intelligent system component accesses craft interface 424. In some embodiments, a single intelligent system component may simultaneously host the two buses associated with both system resources.

The access mechanism to craft interface 424 of system 400 parallels that described above for central storage 208 of system 200 of FIG. 2. In comparison to system 200, system 400 further includes a second bus 428 and its associated host selection device, mux 430, that allows one of the plurality of intelligent system components to host bus 428 to directly access craft interface 424. Bus 428 may be any single host bus. As depicted in FIG. 4, each potential host of bus 428 (i.e. each intelligent system component, e.g., 402-406, etc.) is physically connected to mux 430. For example, intelligent line card 406 is connected to mux 430 via connection 432. In some embodiments, bus 428 is a USB bus, mux 430 is a USB mux, and connection 432 is a USB connection. The management processors of the potential hosts of bus 428 determine which host wins access, and the winning host's management processor issues a signal or command on control bus 414 that is converted into selection control signal 434 for mux 430 by control bus port 436. Control bus 414 may be used by the management processors to issue signals or commands to both control bus port 422 and control bus port 436. If control bus 414 is an $I^2C$ bus, control bus ports 422 and 436 are $I^2C$ ports which may be implemented with $I^2C$ IO Expanders. Selection control signal 434 of mux 430 determines which intelligent system component hosts bus 428. That is, selection control signal 434 determines which intelligent system component is logically connected by mux 430 as host of bus 428. The host of bus 428 may directly and exclusively access craft interface 424.

In some embodiments, if the intelligent system components and a shared system resource (e.g., central storage 408, craft interface 424, etc.) support different types of interfaces, a converting device (e.g., a USB-RS232 converter) may be necessary between the multiplexer of the bus and the associated shared system resource. In some embodiments, a bus and an associated host selection device (e.g., a multiplexer) is deployed for each shared system resource as depicted in FIG. 4. A system may include shared resources in addition to or other than central storage 408 and/or craft interface 424. For each shared system resource accessible via a separate multiplexer/bus configuration, a separate controller is required at each potential host, one for each such shared system resource. For example, if the buses and associated multiplexers are USB, a separate USB controller is required at each host for each USB bus/mux in the system. The number of controllers at each potential host may be minimized by placing one or more resources behind a hub, as in FIG. 3. However, this minimization of the number of controllers at a host is done at the expense of having to give exclusive access to multiple system resources to a single host.

Figure 5:
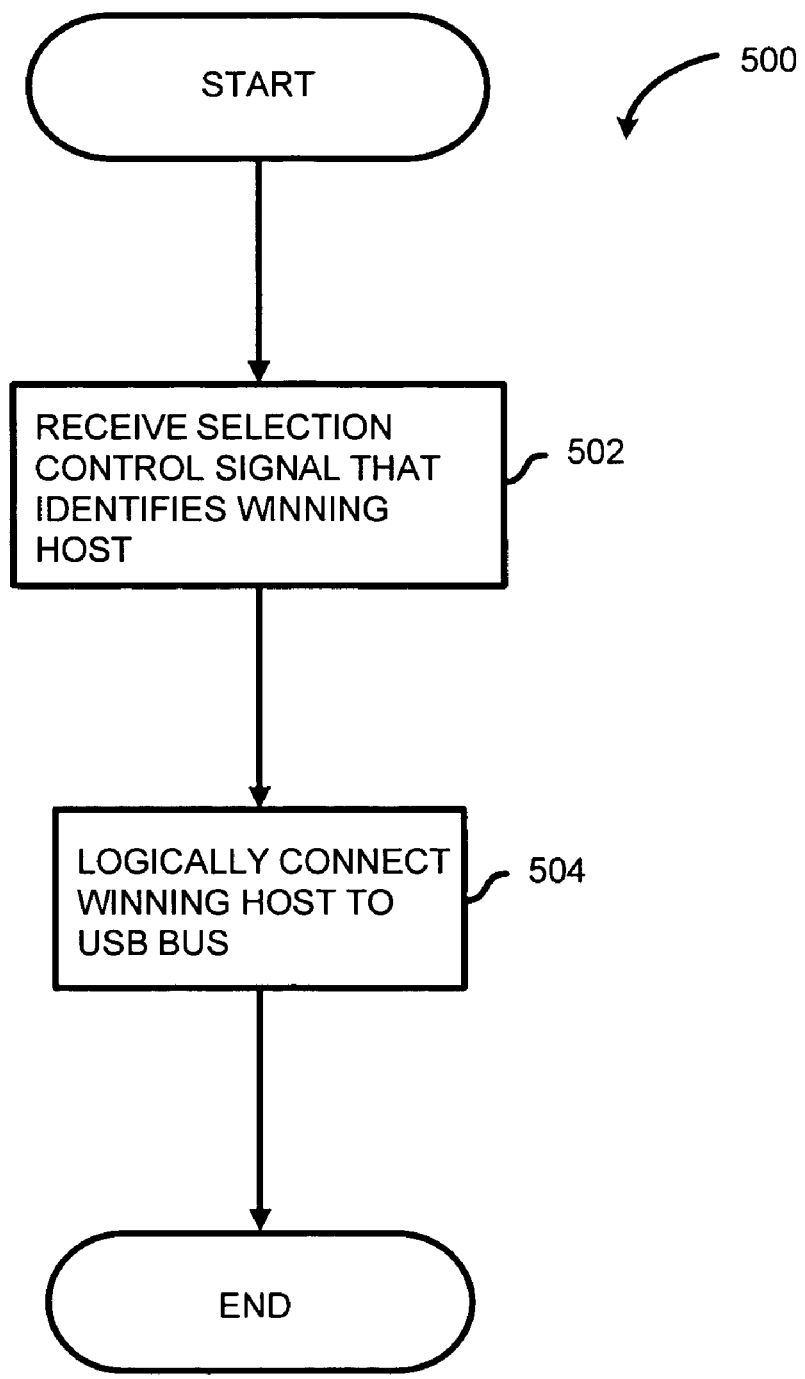
FIG. 5 illustrates an embodiment of a process that is employed by a host selection device.

FIG. 5 illustrates an embodiment of a process that is employed by a host selection device. In some embodiments, process 500 of FIG. 5 is employed by a host selection device such as a multiplexer to logically connect an intelligent system component to host a bus associated with one or more shared system resources. At 502, a selection control signal that identifies the winning host is received. In some embodiments, the management processor of the winning host issues a signal or command on its associated control bus that is converted by a device into the selection control signal received at 502. At 504, the winning host identified by the selection control signal received at 502 is logically connected to host the bus associated with one or more shared system resource(s).

Figure 6:
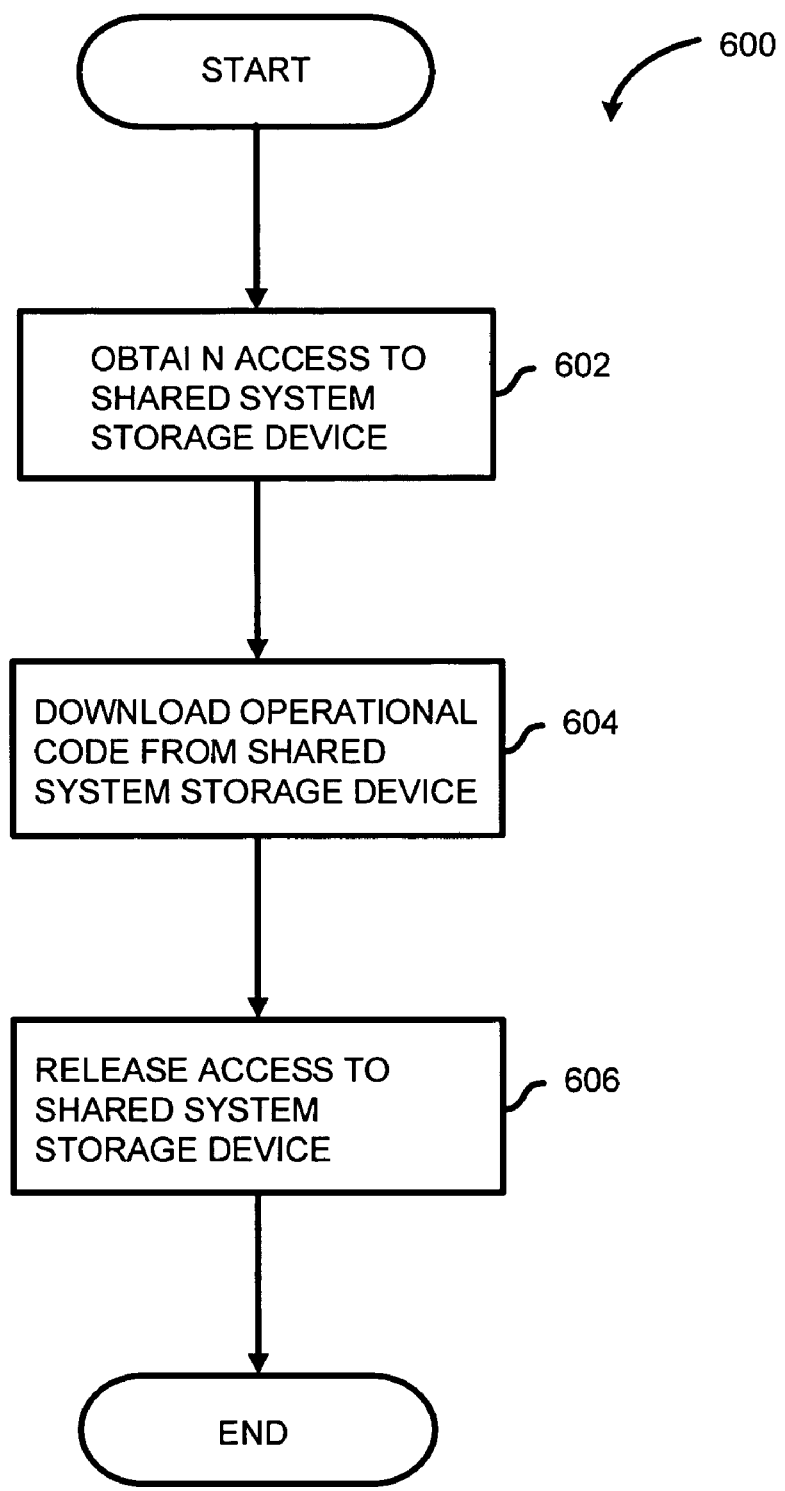
FIG. 6 illustrates an embodiment of a process used to boot an intelligent system component.

FIG. 6 illustrates an embodiment of a process used to boot an intelligent system component. Process 600 may be employed by a shelf controller or a line card to obtain operational code necessary for booting from a globally shared system storage device. At 602, access to a shared system storage device is obtained. At 604, operational code is downloaded from the shared system storage device. At 606, access to the shared system storage device is released, making it available to other intelligent system components. Upon initial start up or boot up of a system, process 600 may be serially performed by each intelligent system component. Additionally, process 600 may be performed by a compromised intelligent system component and/or an operational intelligent system component on behalf of a compromised intelligent system component to restore the compromised component to its normal operational state.

As described herein, it is advantageous to enable each intelligent system component to independently boot from a system storage device. By connecting each intelligent system component to a host selection device associated with a bus used to access the system storage device, each intelligent system component may independently access the system storage device if selected to host the bus. For the chassis associated with a typical gateway device, for example, system redundancy and availability is improved by allowing the line cards to independently access the system storage device in the manner described herein. In addition, the overhead associated with having a shelf controller serially retrieve operational code from the system storage device and subsequently communicate it to the line cards is eliminated. Specifically, enabling each intelligent system component to directly access the system storage device to retrieve its associated operational code results in faster boot times. It is also advantageous to enable each intelligent system component to directly access other shared system resources, such as the craft interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for booting from a system storage device comprising:
   selecting a host of a bus from a shelf controller or a line card wherein the shelf controller and the line card are communicatively coupled to a host selection device;
   obtaining access by the host to the system storage device;
   downloading operational code from the system storage device directly to the host; and
   releasing access of the system storage device by the host, wherein the downloaded operational code is used by the host to boot.

2. A system configured to boot components from a system storage device comprising:
   a bus configured to have a host;
   a shelf controller configured to host the bus;
   a plurality of line cards configured to host the bus;
   a multiplexer configured to select the shelf controller or one of the line cards as the host of the bus wherein the shelf controller and the line cards are communicatively coupled to the multiplexer; and
   a system storage device configured to be accessed by the host of the bus;
   wherein the system storage device includes operational code that is used by the host to boot after the host is selected by the multiplexer and has downloaded the operational code from the system storage device.

3. The system as recited in claim 2, further comprising a plurality of management processors wherein the shelf controller and the plurality of line cards each includes a management processor.

4. The system as recited in claim 2, further comprising a plurality of management processors wherein the shelf controller and the plurality of line cards each includes a management processor and wherein a management processor is part of a management plane.

5. The system as recited in claim 2, wherein the bus is a first bus and further comprising:
   a second bus that is used by the plurality of management processors to communicate with one another to select the shelf controller or one of the line cards as the host of the first bus.

6. The system as recited in claim 5, wherein the second bus is a control bus.

7. The system as recited in claim 5, wherein the second bus is an Inter-Integrated Circuit (I²C) bus.

8. The system as recited in claim 5, wherein the bus is a first bus and further comprising:
   a device that receives via the second bus a signal that identifies the shelf controller or one of the line cards as the host of the first bus.

9. The system as recited in claim 8, wherein the device is an Inter-Integrated Circuit (I²C) Input/Output (IO) Expander.

10. The system as recited in claim 8, wherein the device converts the signal into a selection control signal for the host selection device.

11. The system as recited in claim 8, wherein the device converts the signal into a selection control signal for the host selection device and wherein the host selection device logically connects the host identified by the selection control signal as the host of the first bus.

12. The system as recited in claim 2, wherein the bus is a single host bus.

13. The system as recited in claim 2, wherein the bus is a Universal Serial Bus (USB).

14. The system as recited in claim 2, wherein the shelf controller is an active shelf controller and further comprising a passive shelf controller.

15. The system as recited in claim 2, further comprising a hub that allows simultaneous access to a plurality of system resources to the host of the bus.

16. The system as recited in claim 2, further comprising a hub that allows simultaneous access to a plurality of system resources to the host of the bus wherein the plurality of system resources includes the system storage device.

17. The system as recited in claim 2, further comprising a hub that allows simultaneous access to a plurality of system resources to the host of the bus wherein the plurality of system resources includes an external interface.

18. The system as recited in claim 2, further comprising a hub that allows simultaneous access to a plurality of system resources to the host of the bus wherein the plurality of system resources includes an external interface and wherein the external interface is a craft interface.

19. The system as recited in claim 2, further comprising a hub that allows simultaneous access to a plurality of system resources to the host of the bus wherein the plurality of system resources includes an external interface and wherein the external interface is a craft interface and wherein the craft interface includes a modem port and a console port.

20. The system as recited in claim 2, wherein the bus is a first bus and the host selection device is a first host selection device and further comprising:
   a second bus configured to have a host and wherein the shelf controller and plurality of line cards are configured to host the second bus and access an external interface via the second bus; and
   a second host selection device configured to select the shelf controller or one of the line cards as the host of the second bus.

21. A computer program product for booting a line card from a system storage device, the computer program product being embodied in a computer readable medium and comprising computer instructions for:
   selecting a host of a bus from a shelf controller or a line card wherein the shelf controller and the line card are communicatively coupled to a host selection device;
   obtaining access by the host to the system storage device;
   downloading operational code from the system storage device directly to the host; and
   releasing access of the system storage device by the host, wherein the downloaded operational code is used by the host to boot.

* * * * *

UNITED STATES PATENT AND TRADEMARK OFFICE
CERTIFICATE OF CORRECTION

| | | |
|---|---|---|
| PATENT NO. | : 7,574,589 B1 | Page 1 of 1 |
| APPLICATION NO. | : 11/123864 | |
| DATED | : August 11, 2009 | |
| INVENTOR(S) | : Jaswa et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Seventh Day of September, 2010

David J. Kappos
*Director of the United States Patent and Trademark Office*